(12) United States Patent
Shibata et al.

(10) Patent No.: US 11,366,627 B2
(45) Date of Patent: Jun. 21, 2022

(54) DISPLAY CONTROL DEVICE, DISPLAY SYSTEM, DISPLAY DEVICE, AND DISPLAY METHOD

(71) Applicant: MITSUBISHI ELECTRIC CORPORATION, Tokyo (JP)

(72) Inventors: Masahiko Shibata, Tokyo (JP); Satoshi Mii, Tokyo (JP); Daiki Nakahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/856,755

(22) Filed: Apr. 23, 2020

(65) Prior Publication Data

US 2020/0249896 A1 Aug. 6, 2020

Related U.S. Application Data

(63) Continuation of application No. PCT/JP2017/045287, filed on Dec. 18, 2017.

(51) Int. Cl.
*G06F 3/14* (2006.01)
*G06F 3/0482* (2013.01)
*G05B 19/042* (2006.01)

(52) U.S. Cl.
CPC ............. *G06F 3/14* (2013.01); *G05B 19/042* (2013.01); *G06F 3/0482* (2013.01); *G05B 2219/23137* (2013.01)

(58) Field of Classification Search
CPC ............ G06F 3/14; G06F 3/0482; G05B 2219/23137; G05B 19/042
See application file for complete search history.

(56) References Cited

U.S. PATENT DOCUMENTS 5,555,201 A * 9/1996 Dangelo ........ G01R 31/318364
714/E11.167
5,570,300 A * 10/1996 Henry ................. G01F 15/024
702/45

(Continued)

FOREIGN PATENT DOCUMENTS

CN 103400040 A * 11/2013
CN 103460637 A * 12/2013 ............. G06N 7/005

(Continued)

OTHER PUBLICATIONS

Jeff Kelly and John Hedengren, "A Steady-State Detection (SSD) Algorithm to Detect Non-Stationary Drifts in Processes", published in BYU ScholarsArchive Faculty Publications (2013), retrieved from https://apm.byu.edu/prism/uploads/Members/kelly_jpc2013.pdf (Year: 2013).*

(Continued)

*Primary Examiner* — Shourjo Dasgupta
(74) *Attorney, Agent, or Firm* — Birch, Stewart, Kolasch & Birch, LLP (57) ABSTRACT

In a display control device (10), an acquisition unit (21) acquires a value of a signal outputted from an apparatus (60) during execution of a control program (52) which controls the apparatus (60). A control unit (22) controls a display device (30) to display a code of the control program (52) on a screen (54), and to display the value of the signal acquired by the acquisition unit (21), on a portion in the code of the control program (52) which corresponds to the signal, in a format that enables distinction of a state of the apparatus (60) of the time the value of the signal is outputted.

12 Claims, 9 Drawing Sheets

(56) References Cited

U.S. PATENT DOCUMENTS

| | | | | |
|---|---|---|---|---|
| 5,774,378 | A | * | 6/1998 | Yang .................... G01F 15/024 |
| | | | | 702/109 |
| 6,477,485 | B1 | * | 11/2002 | Radulovic ............ G06K 9/6284 |
| | | | | 702/186 |
| 10,359,757 | B2 | * | 7/2019 | Nagata ............... G05B 19/0426 |
| 10,521,528 | B2 | * | 12/2019 | Biswas .................. G06F 30/33 |
| 10,656,636 | B2 | * | 5/2020 | Fujimura ........... G05B 23/0218 |
| 10,869,614 | B2 | * | 12/2020 | Orr ...................... A61B 5/7221 |
| 2006/0073013 | A1 | * | 4/2006 | Emigholz ............. C10G 11/18 |
| | | | | 416/35 |
| 2007/0168068 | A1 | * | 7/2007 | Saito .................... G05B 19/042 |
| | | | | 700/109 |
| 2009/0210211 | A1 | * | 8/2009 | Honda .................... G06F 30/33 |
| | | | | 703/14 |
| 2013/0030555 | A1 | * | 1/2013 | Starr ................. G05B 23/0216 |
| | | | | 700/83 |
| 2013/0097128 | A1 | * | 4/2013 | Suzuki ............... G06F 16/2365 |
| | | | | 707/693 |
| 2014/0240140 | A1 | * | 8/2014 | Switzer .................. E21B 47/12 |
| | | | | 340/854.6 |
| 2015/0177322 | A1 | * | 6/2015 | Yoshinaga ......... G01R 31/3177 |
| | | | | 714/736 |
| 2015/0339570 | A1 | * | 11/2015 | Scheffler .................. G06N 3/10 |
| | | | | 706/27 |
| 2016/0005298 | A1 | * | 1/2016 | Takahashi ............ G08B 21/187 |
| | | | | 340/679 |
| 2016/0033953 | A1 | | 2/2016 | Nakagawa |
| 2016/0045117 | A1 | * | 2/2016 | Liu ...................... A61B 5/7221 |
| | | | | 600/502 |
| 2016/0287184 | A1 | * | 10/2016 | Diebold ............... A61B 5/7405 |
| 2017/0031329 | A1 | * | 2/2017 | Inagaki ................. G05B 15/02 |
| 2017/0193628 | A1 | * | 7/2017 | Sharma ................. G06T 3/0006 |
| 2018/0017961 | A1 | * | 1/2018 | Bense ............... G05B 23/0235 |
| 2019/0215796 | A1 | * | 7/2019 | Poosamani ......... H04W 52/245 |
| 2019/0265857 | A1 | * | 8/2019 | Chou .................. G06F 3/04164 |
| 2019/0376840 | A1 | | 12/2019 | Koizumi et al. |
| 2019/0385057 | A1 | * | 12/2019 | Litichever ............... H04L 63/14 |

FOREIGN PATENT DOCUMENTS

| | | | | | |
|---|---|---|---|---|---|
| CN | 104050972 | A | * | 9/2014 | ............... G10H 1/40 |
| CN | 107209508 | A | * | 9/2017 | ......... G05B 23/0235 |
| CN | 107342909 | A | * | 11/2017 | ......... G05B 19/0425 |
| CN | 108200590 | A | * | 6/2018 | ............ H04W 16/14 |
| DE | 112013006837 | T5 | | 12/2015 | |
| JP | 4-140803 | A | | 5/1992 | |
| JP | H06-109498 | A | * | 4/1994 | |
| JP | 9-280900 | A | | 10/1997 | |
| JP | 09280900 | A | * | 10/1997 | |
| JP | 2000-29513 | A | | 1/2000 | |
| JP | 3425148 | B2 | | 7/2003 | |
| JP | 2005-115426 | A | | 4/2005 | |
| JP | 2005-128721 | A | | 5/2005 | |
| JP | 2005-301582 | A | | 10/2005 | |
| JP | 2005-346655 | A | | 12/2005 | |
| JP | 2007-102388 | A | | 4/2007 | |
| JP | 2008-512800 | A | | 4/2008 | |
| JP | 2008-226006 | A | | 9/2008 | |
| JP | 2009-223416 | A | | 10/2009 | |
| JP | 2013-33459 | A | | 2/2013 | |
| JP | 2013-89184 | A | | 5/2013 | |
| JP | 2014-507721 | A | | 3/2014 | |
| JP | 2015-32152 | A | | 2/2015 | |
| JP | 2015-162140 | A | | 9/2015 | |
| JP | 2016-164772 | A | | 9/2016 | |
| KR | 101659989 | B1 | | 9/2016 | |
| TW | 201725347 | A | | 7/2017 | |
| WO | WO 2005/091098 | A1 | | 9/2005 | |
| WO | WO 2011/135606 | A1 | | 11/2011 | |
| WO | WO 2014/167726 | A1 | | 10/2014 | |
| WO | WO 2018/150616 | A1 | | 12/2019 | |

OTHER PUBLICATIONS

International Search Report, dated Nov. 6, 2018, for International Application No. PCT/JP2018/032612, with an English translation.
Japanese Notice of Reasons for Refusal, dated Nov. 24, 2020, for Japanese Application No. 2020-540883, with an English translation.
Shibata et al., "Anomaly Detection Method for Digital Control Input-Output Signals", Proceedings of the 80th National Convention of IPSJ: Computer Systems, Software Science/Engineering, Data and Web. Mar. 22, 2018, pp. 1-157 and 1-158, total 5 pages, with an English translation.
Taiwanese Office Action and Search Report, dated Jan. 15, 2021, for Taiwanese Application No. 108105574, with an English machine translation of the Taiwanese Office Action.
International Search Report, issued in PCT/JP2017/045287, dated Mar. 6, 2018.
Taiwanese Office Action, issued in Application No. 107110692, dated Mar. 7, 2019.
Taiwanese Office Action, issued in Application No. 107110692, dated Nov. 6, 2019.
U.S. Appl. No. 17/152,469, filed Jan. 19, 2021.
German Office Action for German Application No. 112017008197.1, dated Feb. 24, 2021, with English translation.
German Office Action for German Application No. 112018007863.9, dated Mar. 22, 2021, with English translation.
Indian Office Action for Indian Application No. 202047019865, dated Aug. 5, 2021, with English translation.
Indian Office Action for Indian Application No. 201947050929, dated Mar. 4, 2021, with English translation.
German Office Action for German Application No. 1120180070863.9, dated Mar. 22, 2021, with English translation.
Office Action dated Sep. 17, 2021 in German Application No. 112018007863.9 corresponding to co-pending U.S. Appl. No. 17/152,469.
Office Action dated Feb. 22, 2022 in Indian Application No. 202147007501 corresponding to co-pending U.S. Appl. No. 17/152,469.
Office Action dated Apr. 7, 2022 in Chinese Application No. 201880096843.2 corresponding to co-pending U.S. Appl. No. 17/152,469.

* cited by examiner

DISPLAY CONTROL DEVICE, DISPLAY SYSTEM, DISPLAY DEVICE, AND DISPLAY METHOD

CROSS REFERENCE TO RELATED APPLICATIONS

This application is a Continuation of PCT International Application No. PCT/JP2017/045287, filed on Dec. 18, 2017, which is hereby expressly incorporated by reference into the present application.

TECHNICAL FIELD

The present invention relates to a display control device, a display system, a display device, a display method, and a display program.

BACKGROUND ART

Patent Literature 1 and Patent Literature 2 describe a technique of displaying a time chart of normal data change and a time chart of abnormal data change by overlapping.

Patent Literature 3 describes a technique of displaying a time chart of normal data change and a time chart of abnormal data change adjacently.

Patent Literature 1 further describes a technique of displaying a portion where an abnormality occurs for the first time in individual data, in order from the top of the program.

CITATION LIST

Patent Literature

Patent Literature 1: JP 2005-115426 A
Patent Literature 2: JP 2005-128721 A
Patent Literature 3: JP 2007-102388 A

SUMMARY OF INVENTION

Technical Problem

In the prior art, it is difficult to grasp that a signal corresponding to what portion in a code of a control program which controls an apparatus, is outputted as what value from the apparatus when the apparatus is in a steady state, or is outputted as what value from the apparatus when the apparatus is in an unsteady state.

It is an objective of the present invention to make it easier to grasp that a signal corresponding to what portion in a code of a control program is outputted as what value from the apparatus when the apparatus is in what state.

Solution to Problem

A display control device according to an aspect of the present invention includes:
an acquisition unit to acquire a value of a signal outputted from an apparatus during execution of a control program which controls the apparatus; and
a control unit to control a display device to display a code of the control program on a screen, and to display the value of the signal acquired by the acquisition unit, on a portion in the code which corresponds to the signal, in a format that enables distinction of a state of the apparatus of a time the value of the signal is outputted.

Advantageous Effects of Invention

In the present invention, a value of a signal outputted from an apparatus is displayed on a portion that corresponds to the signal in a code of a control program which controls the apparatus, in a format that enables distinction of a state of the apparatus of a time the value of the signal is outputted. Therefore, it becomes easy to grasp that a signal corresponding to what portion in the code of the control program is outputted as what value from the apparatus when the apparatus is in what state.

DESCRIPTION OF EMBODIMENTS

Embodiments of the present invention will be described below with referring to drawings. In the drawings, the same or equivalent parts are denoted by the same reference numerals. In the description of embodiments, explanation on the same or equivalent parts will be appropriately omitted or simplified. Note that the present invention is not limited to the embodiments described below and that various changes can be made as necessary. For example, of the embodiments described below, two or more embodiments may be combined and practiced. Alternatively, of the embodiments described below, one embodiment or a combination of two or more embodiments may be practiced partially.

Embodiment 1

Figure 1:
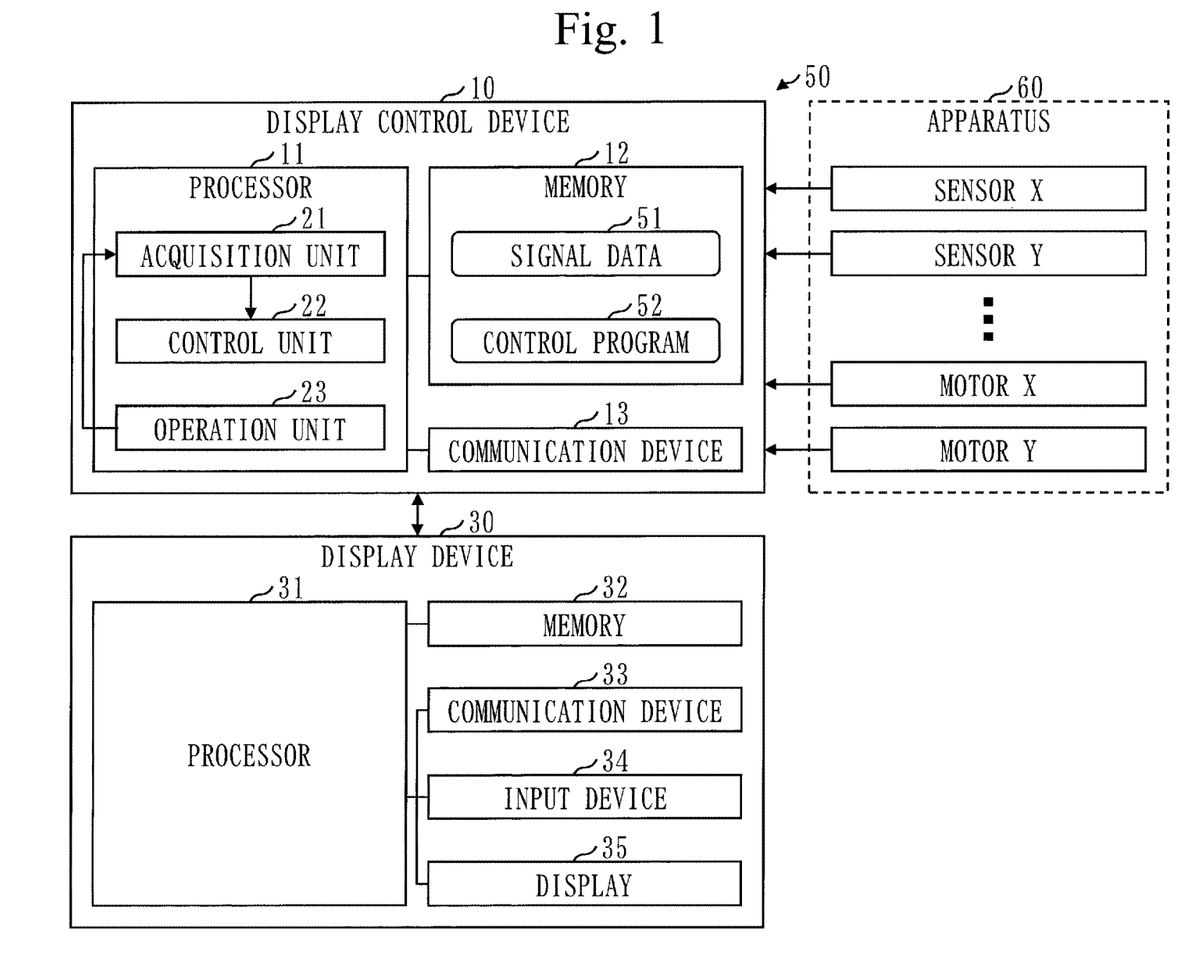
FIG. 1 is a block diagram illustrating a configuration of a display system according to Embodiment 1.
Figure 2:
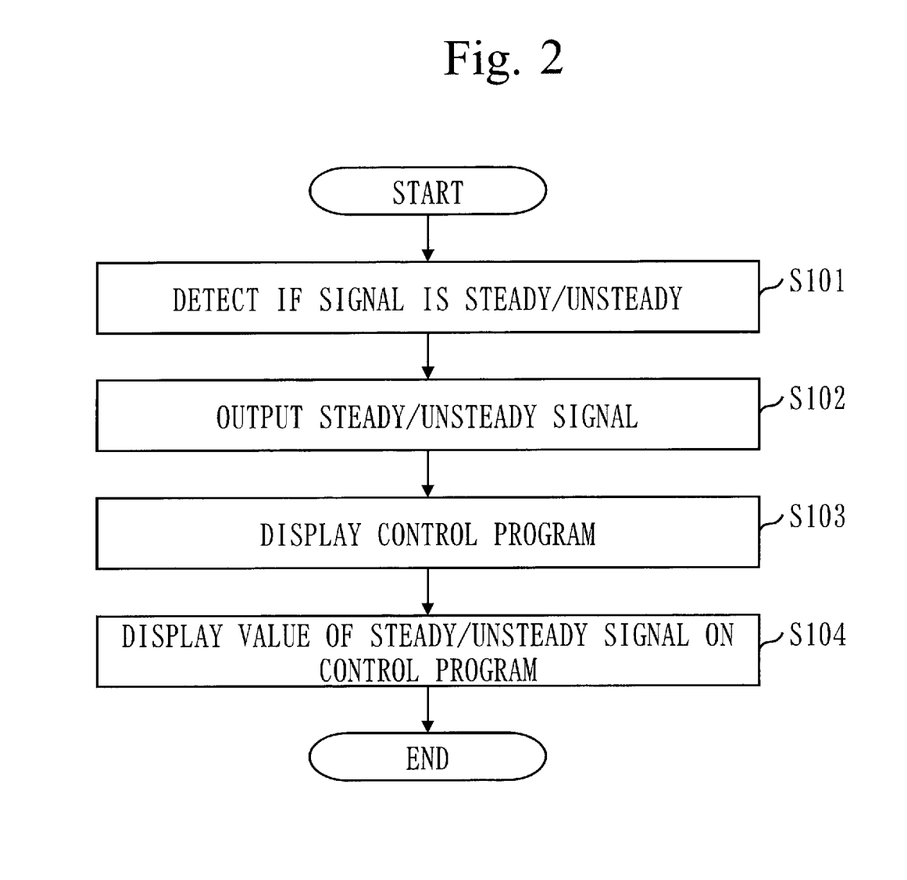
FIG. 2 is a flowchart illustrating behavior of the display system according to Embodiment 1.

The present embodiment will be described with referring to FIGS. 1 to 3.

\*\*\* Description of Configuration \*\*\*

A configuration of a display system 50 according to the present embodiment will be described with referring to FIG. 1.

The display system 50 is provided with a display control device 10 and a display device 30.

The display control device 10 is connected to the display device 30 and a plurality of apparatuses 60 via a network such as a LAN. Note that "LAN" stands for Local Area Network.

The display control device 10 is a computer such as a PC. Note that "PC" stands for Personal Computer. The display control device 10 is provided with a processor 11 and is provided with other hardware devices such as a memory 12 and a communication device 13. The processor 11 is connected to the other hardware devices via a signal line and controls these other hardware devices.

The display control device 10 is provided with an acquisition unit 21, a control unit 22, and an operation unit 23, as function elements. Functions of the acquisition unit 21, control unit 22, and operation unit 23 are implemented by software.

The processor 11 is a device that executes a display program. The display program is a program that implements the functions of the acquisition unit 21, control unit 22, and operation unit 23. The processor 11 is, for example, a CPU. Note that "CPU" stands for Central Processing Unit.

The memory 12 is a device that stores the display program. The memory 12 is, for example, a flash memory or a RAM. Note that "RAM" stands for Random Access Memory.

The communication device 13 includes a receiver to receive data to be inputted to the display program and a transmitter to transmit data outputted from the display program. The communication device 13 is, for example, a communication chip or an NIC. Note that "NIC" stands for Network Interface Card.

The display program is read by the processor 11 and executed by the processor 11. Not only the display program but also an OS is stored in the memory 12. Note that "OS" stands for Operating System. The processor 11 executes the display program while executing the OS.

The display program and the OS may be stored in an auxiliary storage device. The auxiliary storage device is, for example, a flash memory or an HDD. Note that "HDD" stands for Hard Disk Drive. If stored in the auxiliary storage device, the display program and the OS are loaded to the memory 12 and executed by the processor 11.

The display program may be incorporated in the OS partially or entirely.

The display control device 10 may be provided with a plurality of processors which replace the processor 11. The plurality of processors share execution of the display program. Each processor is, for example, a CPU.

Data, information, a signal value, and a variable value which are utilized, processed, or outputted by the display program are stored in the memory 12, the auxiliary storage device, or a register or cache memory in the processor 11. In the present embodiment, at least signal data 51 and a control program 52 are stored in the memory 12.

The signal data 51 is time-series data expressing values of signals outputted from individual apparatuses 60. Each signal is a binary signal in the present embodiment, but may be another type of signal such as an analog signal.

The control program 52 is a program that controls each apparatus 60. The control program 52 is a ladder program in the present embodiment, but may be another type of program such as a C-language program.

The display program is a program that causes the computer to execute a process performed by the acquisition unit 21, a process performed by the control unit 22, and a process performed by the operation unit 23, as an acquisition process, a control process, and an operation process, respectively. The display program may be recorded in a computer-readable medium and provided in the form of the medium, may be stored in a recording medium and provided in the form of the recording medium, or may be provided in the form of a program product.

The display control device 10 may be constituted of one computer or a plurality of computers. When the display control device 10 is constituted of a plurality of computers, the functions of the acquisition unit 21, control unit 22, and operation unit 23 may be implemented by distribution among the computers.

The display device 30 is a device that is controlled by the display control device 10 via the network.

The display device 30 is a computer such as a tablet computer. The display device 30 is provided with the processor 31, and is also provided with other hardware devices such as a memory 32, a communication device 33, an input device 34, and a display 35. The processor 31 is connected to the other hardware devices via a signal line and controls the other hardware devices.

The processor 31 is, for example, a CPU.

The memory 32 is, for example, a flash memory or a RAM.

The communication device 33 is, for example, a communication chip or an NIC.

The input device 34 is, for example, a touch panel, a mouse, or a keyboard.

The display 35 is, for example, an LCD. Note that "LCD" stands for Liquid Crystal Display. The display 35 may be a touch panel serving also as the input device 34.

The display device 30 need not be a computer but may be a mere display. When the display device 30 is a mere display, the display control device 10 is connected to the display device 30 via a signal line such as a USB cable, or by wireless connection. Note that "USB" stands for Universal Serial Bus. When the display device 30 is not a touch panel, the display control device 10 is also connected to an input device independent of the display device 30 via a signal line or by wireless connection.

The plurality of apparatuses 60 include two or more sensors such as a sensor X and a sensor Y, and two or more motors such as a motor X and a motor Y. The plurality of apparatuses 60 may include any number of apparatuses 60 of any type as long as they are controlled by the control program 52 to output signals whose values can be acquired as the signal data 51. The number of apparatuses 60 is not limited to 2 or more but may be 1.

In order to simplify the explanation, in the present embodiment, assume that each apparatus 60 outputs only one type of signal. The plurality of apparatuses 60 may include an apparatus 60 that outputs two or more types of signals.

* Description of Behavior *

Behavior of the display system 50 according to the present embodiment will be described with referring to FIG. 2. The behavior of the display system 50 corresponds to a display method according to the present embodiment.

In step S101, the display control device 10 detects whether a signal is a steady signal or an unsteady signal.

A steady signal is a signal outputted from the apparatus 60 when the apparatus 60 is in a steady state. An unsteady signal is a signal outputted from the apparatus 60 when the apparatus 60 is in an unsteady state. In the present embodiment, a signal outputted from each apparatus 60 when the plurality of apparatuses 60 are in a steady state as a whole corresponds to the steady signal. A signal outputted from each apparatus 60 when the plurality of apparatuses 60 are in an unsteady state as a whole corresponds to the unsteady signal. A signal actually outputted from each apparatus 60 is sometimes called merely a "signal".

A process of step S101 will be described in detail.

In the display control device 10, the acquisition unit 21 reads the control program 52 from the memory 12. The acquisition unit 21 executes the readout control program 52. Using the communication device 13, while monitoring the states of the plurality of apparatuses 60, the acquisition unit 21 receives the signals which are outputted from the apparatuses 60 during execution of the control program 52. The acquisition unit 21 records values of the received signals in the memory 12 as the signal data 51. That is, the acquisition unit 21 generates the signal data 51 of the signals actually outputted from the apparatuses 60, and records the generated signal data 51 in the memory 12. Furthermore, the acquisition unit 21 predicts values of signals to be outputted from the apparatuses 60 when the apparatuses 60 are in an unsteady state. The acquisition unit 21 records the predicted values in the memory 12 as prediction data (not illustrated). That is, the acquisition unit 21 generates the prediction data of the signals which are outputted from the apparatuses 60 when the apparatuses 60 are in the steady state, and records the generated prediction data in the memory 12. Moreover, the acquisition unit 21 compares the signal data 51 with the prediction data to determine whether the received signals are steady signals or unsteady signals. The acquisition unit 21 records a determination result in the memory 12 by associating the determination result with the signal data 51.

Instead of executing the control program 52 by the acquisition unit 21, a computer different from the display control device 10 may execute the control program 52. Instead of generating the signal data 51 by the acquisition unit 21, a computer different from the display control device 10 may generate signal data 51 and may record the generated signal data 51 in the memory 12 of the display control device 10. Instead of generating the prediction data by the acquisition unit 21, a computer different from the display control device 10 may generate prediction data and may record the generated prediction data in the memory 12 of the display control device 10. As for the signals periodically outputted from the apparatuses 60, reception data of signals which are outputted from the apparatuses 60 when the apparatuses 60 are in the steady state may be used in place of the prediction data. The prediction data may be generated before the signal data 51. Instead of comparing the signal data 51 with the prediction data by the acquisition unit 21, a computer different from the display control device 10 may compare the signal data 51 with the prediction data, and may record a determination result of whether the received signals are steady signals or unsteady signals, in the memory 12 of the display control device 10, by associating the determination result with the signal data 51.

A case will be described below where in step S101 the received signals are determined as unsteady signals. Substantially the same will apply to a case where the received signals are determined as steady signals, except that unsteady signals are replaced by steady signals.

Figure 3:
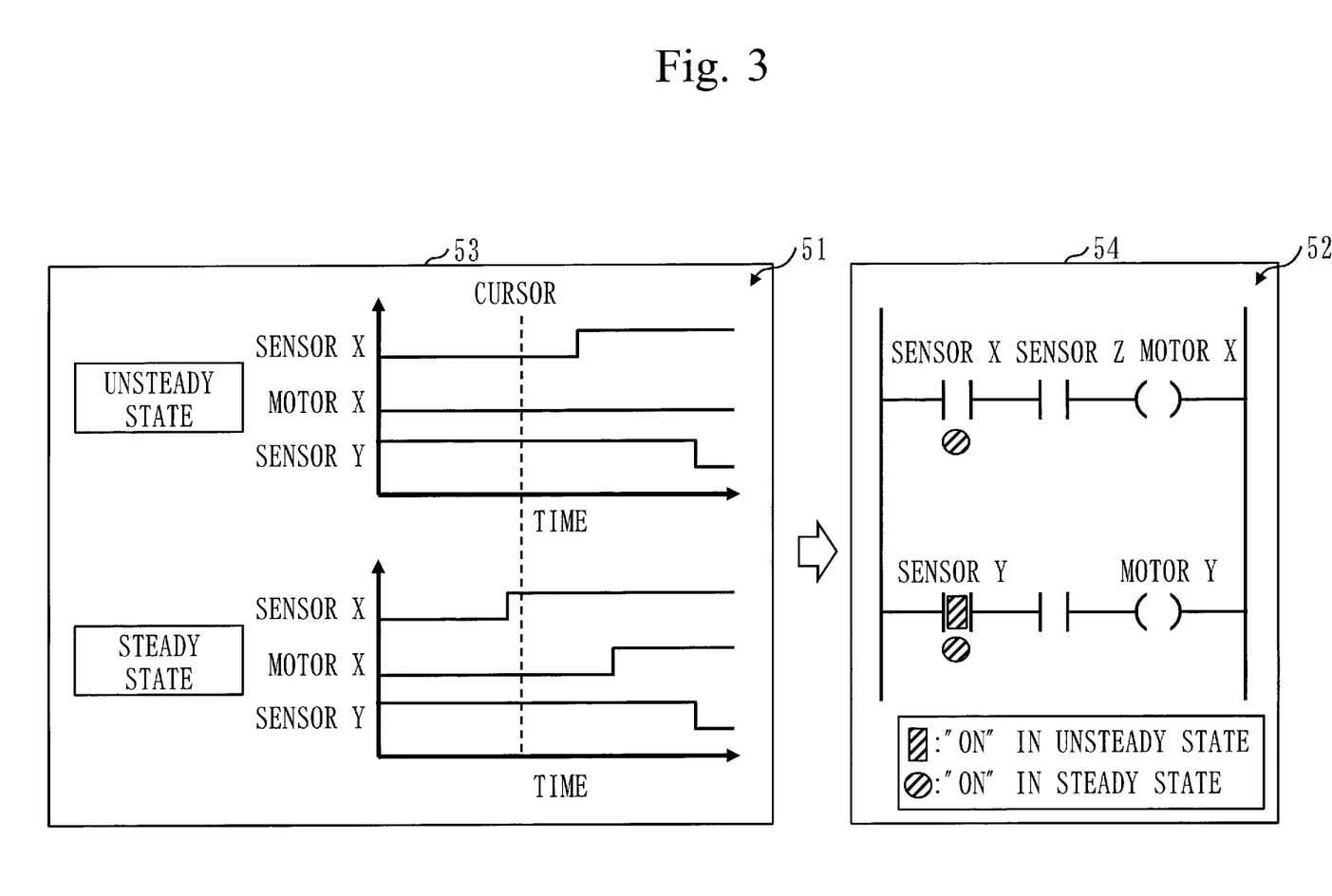
FIG. 3 is a diagram illustrating a screen example of the display system according to Embodiment 1.

In step S102, the display control device 10 controls the display device 30 to output, to the display 35, a screen 53 of unsteady signals and steady signals, as illustrated in FIG. 3.

A process of step S102 will be described in detail.

In the display control device 10, the acquisition unit 21 reads the signal data 51 determined as unsteady signals from the memory 12. Doing this, the acquisition unit 21 acquires values of the signals which are outputted from the apparatuses 60 during execution of the control program 52. Specifically, the acquisition unit 21 acquires the signal data 51 being the values of the signals outputted from the apparatuses 60, and takes the values of the signal data 51 as values of the unsteady signals. Moreover, the acquisition unit 21 reads the steady-signal prediction data from the memory 12. Doing this, the acquisition unit 21 acquires values which are outputted when the apparatuses 60 are in a steady state during execution of the control program 52. Specifically, the acquisition unit 21 acquires the prediction data which has been predicted to be outputted when the apparatuses 60 are in the steady state, and takes the prediction data as the values of the steady signals.

Using the communication device 13, the control unit 22 transmits the unsteady-signal signal data 51 read by the acquisition unit 21 to the display device 30. Doing this, the control unit 22 controls the display device 30 to display, on the screen 53, a time chart expressing a change in values of the signals acquired by the acquisition unit 21. Specifically, the control unit 22 controls the display device 30 to display, on the screen 53, a time chart expressing a change in values actually outputted when the apparatuses 60 are in an unsteady state, as a change in values of the signals. That is, the control unit 22 controls the display device 30 to display, on the screen 53, an unsteady-state actual time chart obtained from real-time signals. Moreover, using the communication device 13, the control unit 22 transmits the steady-signal prediction data read by the acquisition unit 21 to the display device 30. Doing this, the control unit 22 controls the display device 30 to display, on the screen 53, a time chart expressing a change in values which have been predicted to be outputted when the apparatuses 60 are in a steady state. That is, the control unit 22 controls the display device 30 to display, on the screen 53, a steady-state prediction time chart.

As described earlier, regarding the signals periodically outputted from the apparatuses 60, the reception data may be used in place of the prediction data. Therefore, an actual time chart of a steady state that appears periodically may be displayed in place of the steady-state prediction time chart.

Using the communication device 33, the display device 30 receives the unsteady-signal signal data 51 transmitted by the control unit 22. The display device 30 generates an unsteady-signal time chart from the received unsteady-signal signal data 51. The display device 30 displays the generated unsteady-signal time chart on the screen 53. Doing this, the display device 30 displays, on the screen 53, a time chart expressing a change in values of the signals acquired by the acquisition unit 21. Specifically, the display device 30 displays, on the screen 53, a time chart expressing a change in values of the signal data 51, being values of the signals outputted from the apparatuses 60, as a change in values of the unsteady signals. Moreover, using the communication device 33, the display device 30 receives the steady-signal prediction data transmitted by the control unit 22. The display device 30 generates a steady-signal time chart from the received steady-signal prediction data. The display device 30 displays the generated steady-signal time chart with the unsteady-signal time chart, adjacently on the screen 53 simultaneously. Doing this, the display device 30 displays, on the screen 53, a time chart expressing a change in values predicted to be outputted when the apparatuses 60 are in the steady state, together with a time chart expressing a change in values actually outputted when the apparatuses 60 are in the unsteady state.

Instead of generating the time chart by the display device 30, the control unit 22 of the display control device 10 may generate a time chart and may transmit the generated time chart to the display device 30. If a process of generating the time chart by the display device 30 becomes unnecessary, a load to the display device 30 can be reduced. Alternatively, it will be possible to handle a case where the display device 30 serves as a mere display.

In step S103, the display control device 10 controls the display device 30 to display the control program 52 on a screen 54 as illustrated in FIG. 3.

What part of the control program 52 is to display may be designated arbitrarily. A portion corresponding to the unsteady signals may be extracted and designated by the display control device 10. A portion a user wishes to display may be designated by the user.

A process of step S103 will be described in detail.

In the display control device 10, the control unit 22 reads the control program 52 from the memory 12. Using the communication device 13, the control unit 22 transmits the readout control program 52 to the display device 30. Doing this, the control unit 22 controls the display device 30 to display a code of the control program 52 on the screen 54.

Using the communication device 33, the display device 30 receives the control program 52 transmitted by the control unit 22. The display device 30 displays the code of the received control program 52 on the screen 54 of the display 35.

In step S104, the display control device 10 controls the display device 30 to display the values of the unsteady signals and the values of the steady signals, simultaneously on the control program 52. As the user changes a display-subject time point of the signals by cursor movement or the like, the display control device 10 updates the values of the signals displayed on the control program 52.

In step S101, if a received signal is determined as a steady signal, the value of only the steady signal is displayed on the control program 52.

A process of step S104 will be described in detail.

The display device 30 accepts, via the input device 34, an operation of the user of moving the cursor along the time axis on the time chart displayed on the screen 53. Using the communication device 33, the display device 30 transmits information expressing a position of the cursor or information expressing a time point corresponding to that position to the display control device 10.

In the display control device 10, using the communication device 13, the operation unit 23 receives the information transmitted by the display device 30. From the received information, the operation unit 23 specifies the time point designated by the user, as the display-subject time point of the signal. Doing this, the operation unit 23 accepts the operation of selecting the display-subject time point of the signal.

The acquisition unit 21 extracts a value of an unsteady signal corresponding to the time point specified by the operation unit 23 from the unsteady-signal signal data 51 read in step S101. Doing this, the acquisition unit 21 acquires a value of a signal outputted from each apparatus 60 at a time point selected by operating the operation unit 23. Moreover, the acquisition unit 21 extracts a value of a steady signal corresponding to the time point specified by the operation unit 23 from the steady-signal prediction data read in step S101. Doing this, the acquisition unit 21 acquires a value of a signal to be outputted from each apparatus 60 at the time point selected by operating the operation unit 23.

Using the communication device 13, the control unit 22 transmits the value of the unsteady signal extracted by the acquisition unit 21 to the display device 30. Doing this, the control unit 22 controls the display device 30 to display the code of the control program 52 on the screen 54, and to display the value of the signal acquired by the acquisition unit 21 on a portion in the code of the control program 52 which corresponds to the signal, in a format that enables distinction of the state of the apparatus 60 of the time the value of the signal is outputted. Furthermore, using the communication device 13, the control unit 22 transmits the value of the steady signal extracted by the acquisition unit 21 to the display device 30. Doing this, the control unit 22 controls the display device 30 to display both of the value of the steady signal and the value of the unsteady signal simultaneously on portions in the code of the control program 52 which correspond to the signals, in a format that enables distinction of the states of the corresponding apparatuses 60.

Using the communication device 33, the display device 30 receives the value of the unsteady signal transmitted by the control unit 22. The display device 30 displays the received value of the unsteady signal on a portion in the code of the control program 52 on the screen 54 which corresponds to the signal, in a format that enables to distinguish that the received value is the value of an unsteady signal. Doing this, the display device 30 displays the code of the control program 52 on the screen 54, and displays the value of the signal acquired by the acquisition unit 21 on a portion in the code of the control program 52 which corresponds to the signal, in a format that enables distinction of the state of the apparatus 60 of the time the value of the signal is outputted. Moreover, using the communication device 33, the display device 30 receives the value of the steady signal transmitted by the control unit 22. The display device 30 displays the received value of the steady signal on a portion in the code of the control program 52 on the screen 54 which corresponds to the signal, in a format that enables to distinguish that the received value is the value of a steady signal. This displaying is performed simultaneously with displaying the value of the unsteady signal. Doing this, the display device 30 displays both of the value of the steady signal and the value of the unsteady signal simultaneously on portions in the code of the control program 52 which correspond to the signals, in a format enables distinction of the states of the corresponding apparatuses 60.

In the present embodiment, the control program 52 is a ladder program which controls two or more sensors such as a sensor X and a sensor Y and two or more motors such as a motor X and a motor Y. The display device 30 displays this ladder program on the screen 54. Regarding each sensor, if the steady signal is ON, the display device 30 displays a colored circle on a corresponding portion in the ladder program on the screen 54. If the steady signal is OFF, the display device 30 displays nothing. Regarding each sensor, if the unsteady signal is ON, the display device 30 displays a colored square on a corresponding portion in the ladder program on the screen 54. If the unsteady signal is OFF, the display device 30 displays nothing. This description for each sensor also applies to each motor.

As a specific example, assume that at a time point selected on the screen 53, a signal from the sensor X is OFF when actually outputted and is ON in the steady state, a signal from the motor X is OFF both when actually outputted and in the steady state, and a signal from the sensor Y is ON both when actually outputted and in the steady state. In this case, the display device 30 displays, in the ladder program on the screen 54, a colored circle on a portion corresponding to the sensor X, displays nothing on a portion corresponding to the motor X, and displays a colored circle and a colored square adjacently on a portion corresponding to the sensor Y.

Alternatively, instead of extracting, by the acquisition unit 21, the value of the signal of the time point designated by the user, and transmitting, by the control unit 22, the extracted value to the display device 30, the display device 30 may extract, from the signal data 51 received in step S102, the value of the signal of the time point designated by the user. Even in this case, the control unit 22 likewise transmits the signal data 51 and the control program 52 to the display device 30. This means that the control unit 22 controls the display device 30 to display the code of the control program 52 on the screen 54, and to display the value of the signal acquired by the acquisition unit 21, on a portion in the code of the control program 52 which corresponds to the signal, in a format that enables distinction of the state of the apparatus 60 of the time the value of the signal is outputted.

Description of Effect of Embodiment

In the present embodiment, the value of the signal outputted from the apparatus 60 is displayed on a portion of a code corresponding to the signal, in the control program 52 that controls the apparatus 60, in a format that enables distinction of the state of the apparatus 60 of the time the value of the signal is outputted. This makes it easier to grasp that a signal corresponding to what portion in the code of the control program 52 is outputted as what value from the apparatus 60 when the apparatus 60 is in what state.

In the present embodiment, the acquisition unit 21 acquires values of the plurality of signals outputted separately from the plurality of apparatuses 60, as the values of the signals. The control unit 22 controls the display device 30 to display a value of each signal acquired by the acquisition unit 21, on a portion in the code of the control program 52 which corresponds to the signal, in a format that enables to distinguish that the value of each signal is outputted in which one of a case where the plurality of apparatuses 60 are in the steady state as a whole and a case where the plurality of apparatuses 60 are in the unsteady state as a whole. Therefore, it is easier to grasp that a signal corresponding to what portion in the code of the control program 52 is outputted as what value from an apparatus 60 when the plurality of apparatuses 60 are in the steady state as a whole, and outputted as what value from a apparatus 60 when the plurality of apparatuses 60 are in the unsteady state as a whole.

In the present embodiment, in displaying a value outputted when the apparatus 60 is in the unsteady state, as a value of a signal, the control unit 22 controls the display device 30 to simultaneously display a value outputted by the apparatus 60 in the steady state. As a modification, the control unit 22 may control the display device 30 to display only a value of a signal. That is, in the present embodiment, the control unit 22 controls the display device 30 to display an actually outputted value as a value of a signal, and simultaneously a value predicted to be outputted by the apparatus 60 in the steady state. In the modification, the control unit 22 may control the display device 30 to display only an actually outputted value.

As a specific example, assume that at a time point selected on the screen 53, a signal from the sensor X is OFF when actually outputted and is ON in the steady state, a signal from the motor X is OFF both when actually outputted and in the steady state, and a signal from the sensor Y is ON both when actually outputted and in the steady state. In this case, in the ladder program on the screen 54, the display device 30 displays nothing on a portion corresponding to the sensor X, displays nothing on a portion corresponding to the motor X, and displays only a colored square on a portion corresponding to the sensor Y.

According to this example, it is easier to grasp that a signal corresponding to what portion in the code of the control program 52 is outputted as what value from the apparatus 60 when the apparatus 60 is in the unsteady state.

In the present embodiment, the signal outputted from each apparatus 60 is a binary signal corresponding to either ON or OFF. However, as a modification, each signal may be an analog signal.

As a specific example, assume that at a time point selected on the screen 53, signals outputted from the sensor X, motor X, and sensor Y are analog signals. In this case the display device 30 displays, in the ladder program on the screen 54, values of signals outputted from the sensor X, motor X, and sensor Y in the steady state, as numerals colored in a first color, on portions corresponding to the sensor X, motor X, and sensor Y, and displays values of signals outputted from the sensor X, motor X, and sensor Y in the unsteady state, as numerals colored in a second color different from the first color.

According to this example, it is easier to grasp that a signal corresponding to what portion in the code of the control program 52 is outputted as what value from the apparatus 60 when the apparatus 60 is in the steady state, and is outputted as what value from the apparatus 60 when the apparatus 60 is in the unsteady state.

In the present embodiment, the control program 52 is a ladder program. As a modification, the control program 52 may be a program such as a C-language program written by a source code.

As a specific example, assume that at a time point selected on the screen 53, a signal from the sensor X is OFF when actually outputted and is ON in the steady state, a signal from the motor X is OFF both when actually outputted and in the steady state, and a signal from the sensor Y is ON both when actually outputted and in the steady state. In this case, the display device 30 displays, in the source code of the control program 52 on the screen 54, a colored circle in the vicinity of a variable corresponding to the sensor X, displays nothing in the vicinity of a variable corresponding to the motor X, and displays a colored circle and a colored square adjacently in the vicinity of a variable corresponding to the sensor Y.

According to this example, it is easier to grasp that a signal corresponding to what variable in the source code, being a kind of the code of the control program 52, is outputted as what value from the apparatus 60 when the apparatus 60 is in the steady state, and is outputted as what value from the apparatus 60 when the apparatus 60 is in the unsteady state.

* Other Configurations *

In the present embodiment, the functions of the acquisition unit 21, control unit 22, and operation unit 23 are implemented by software. As a modification, the functions of the acquisition unit 21, control unit 22, and operation unit 23 may be implemented by a combination of software and hardware. That is, some of the functions of the acquisition unit 21, control unit 22, and operation unit 23 may be implemented by dedicated hardware, and the remaining functions may be implemented by software.

The dedicated hardware is, for example, a single circuit, a composite circuit, a programmed processor, a parallel-programmed processor, a logic IC, a GA, an FPGA, or an ASIC. Note that "IC" stands for Integrated Circuit, "GA" stands for Gate Array, "FPGA" stands for Field-Programmable Gate Array, and "ASIC" stands for Application Specific Integrated Circuit.

The processor 11 and the dedicated hardware are both processing circuitry. That is, regardless of whether the functions of the acquisition unit 21, control unit 22, and operation unit 23 are implemented by software or by a combination of software and hardware, behaviors of the acquisition unit 21, control unit 22, and operation unit 23 are carried out by processing circuitry.

Embodiment 2

The present embodiment will be described regarding mainly its difference from Embodiment 1 with referring to FIGS. 4 and 5.

In the present embodiment, a process of step S104 is different from that of Embodiment 1.

Figure 4:
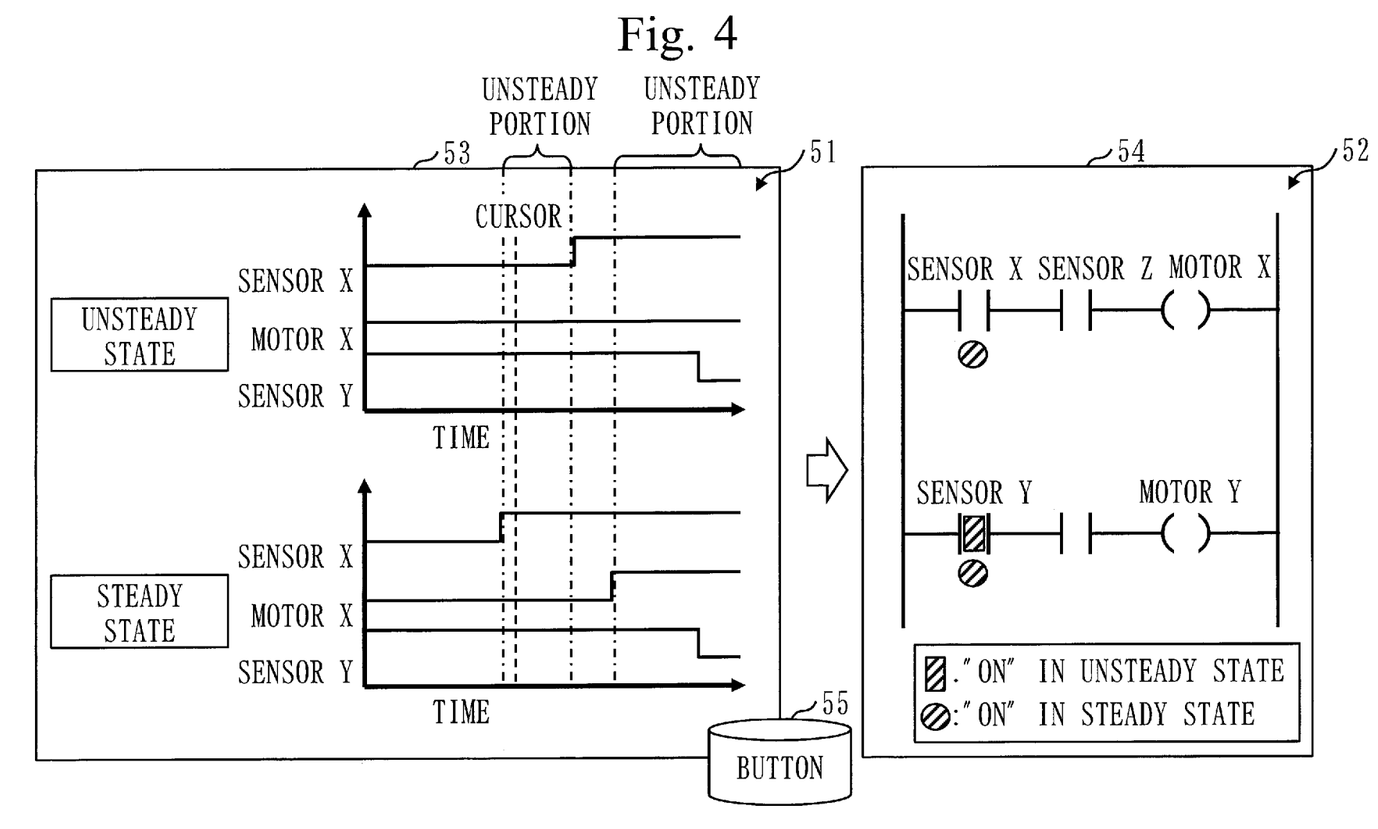
FIG. 4 is a diagram illustrating a screen example of a display system according to Embodiment 2.
Figure 5:
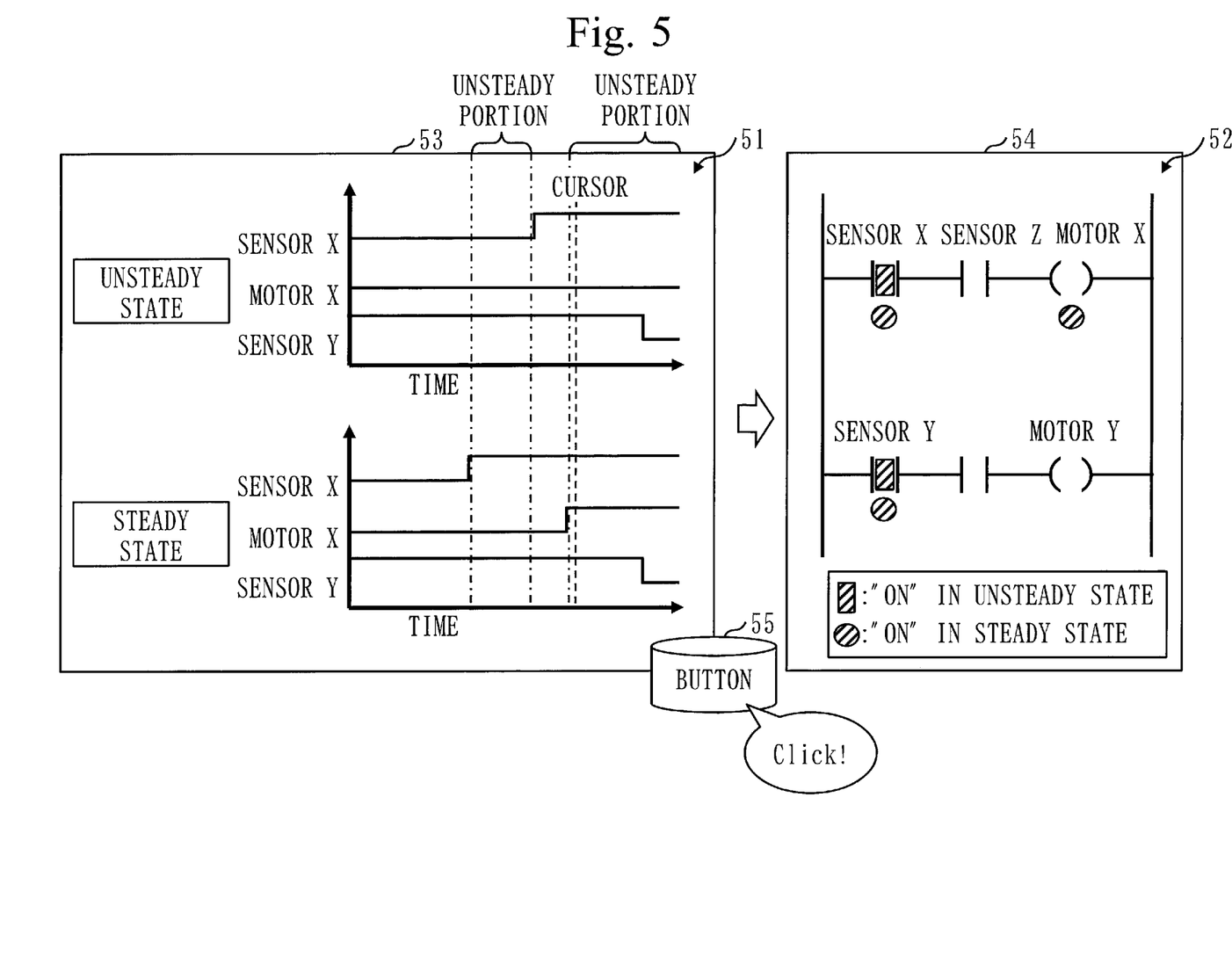
FIG. 5 is a diagram illustrating the screen example of the display system according to Embodiment 2.

In step S104, a display control device 10 controls a display device 30 to display values of unsteady signals and values of steady signals, simultaneously on a control program 52 on a screen 54 as illustrated in FIGS. 4 and 5.

The process of step S104 will be described in detail.

The display device 30 highlights a period where a value of a steady signal and a value of an unsteady signal are different, as an unsteady portion on a time chart displayed on a screen 53. The display device 30 accepts, via an input device 34, an operation of a user of selecting an unsteady portion with a cursor on the time chart displayed on the screen 53. Using a communication device 33, the display device 30 transmits information indicating a position of the cursor or a period corresponding to that position to the display control device 10.

After that, the display device 30 accepts, via the input device 34, a user's operation of pushing a button 55 indicated on the screen 53 or on another region of a display 35. Each time the button 55 is pushed, the display device 30 moves the cursor to the next unsteady portion along the time axis on the time chart displayed on the screen 53. Using the communication device 33, the display device 30 transmits information indicating a moving-destination position of the cursor or a period corresponding to that position to the display control device 10.

In the display control device 10, each time information indicating a position of the cursor or a period corresponding to that position is transmitted from the display device 30, an operation unit 23 receives, using a communication device 13, the information transmitted by the display device 30. From the received information, the operation unit 23 specifies a period designated by the user, as a display-subject period of the signal. Doing this, the operation unit 23 accepts an operation of selecting a display-subject period of the signal from among two or more periods during which a value, different from a value outputted when an apparatus 60 is in a steady state, is outputted as a value of a signal.

An acquisition unit 21 extracts a value of a steady signal corresponding to the period specified by the operation unit 23 and a value of an unsteady signal corresponding to the period specified by the operation unit 23 from the steady-signal prediction data and unsteady-signal signal data 51, respectively, which are read in step S101. Doing this, the acquisition unit 21 acquires a value of a signal outputted from each apparatus 60 during a period selected by operating the operation unit 23.

Using the communication device 13, a control unit 22 transmits the value of the unsteady signal extracted by the acquisition unit 21 to the display device 30. Doing this, the control unit 22 controls the display device 30 to display a code of the control program 52 on the screen 54, and to display the value of the signal acquired by the acquisition unit 21, on a portion in the code of the control program 52 which corresponds to the signal, in a format that enables distinction of the state of the apparatus 60 of the time the value of the signal is outputted. Furthermore, using the communication device 13, the control unit 22 transmits the value of the steady signal extracted by the acquisition unit 21 to the display device 30. Doing this, the control unit 22 controls the display device 30 to display both of the value of the steady signal and the value of the unsteady signal on portions in the code of the control program 52 which correspond to the signals, in a format that enables distinction of the states of the corresponding apparatuses 60.

Using the communication device 33, the display device 30 receives the value of the unsteady signal transmitted by the control unit 22. The display device 30 displays the received value of the unsteady signal on a portion in the code of the control program 52 on the screen 54 which corresponds to the signal, in a format that enables to distinguish that the received value is the value of an unsteady signal. Doing this, the display device 30 displays the code of the control program 52 on the screen 54, and displays the value of the signal acquired by the acquisition unit 21, on a portion in the code of the control program 52 which corresponds to the signal, in a format that enables distinction of the state of the apparatus 60 of the time the value of the signal is outputted. Moreover, using the communication device 33, the display device 30 receives the value of the steady signal transmitted by the control unit 22. The display device 30 displays the received value of the steady signal on a portion in the code of the control program 52 on the screen 54 which corresponds to the signal, in a format that enables to distinguish that the received value is the value of a steady signal. This displaying is performed simultaneously with displaying the value of the unsteady signal. Doing this, the display device 30 displays both of the value of the steady signal and the value of the unsteady signal simultaneously on portions in the code of the control program 52 which correspond to the signals, in a format that enables distinction of the states of the corresponding apparatuses 60.

In the present embodiment, when an unsteady portion occurs a plurality of number of times, the value of the signal displayed on the control program 52 can be switched successively by a simple operation such as pushing the button 55.

Instead of accepting an operation of selecting a display-subject period of a signal from among two or more periods during which a value, different from a value outputted when the apparatus 60 is in a steady state, is outputted as a value of the signal, the operation unit 23 may accept an operation of selecting a display-subject period of the signal from among two or more periods during which a value with an abnormality degree exceeding a threshold value is outputted as the value of the signal.

Embodiment 3

Figure 6:
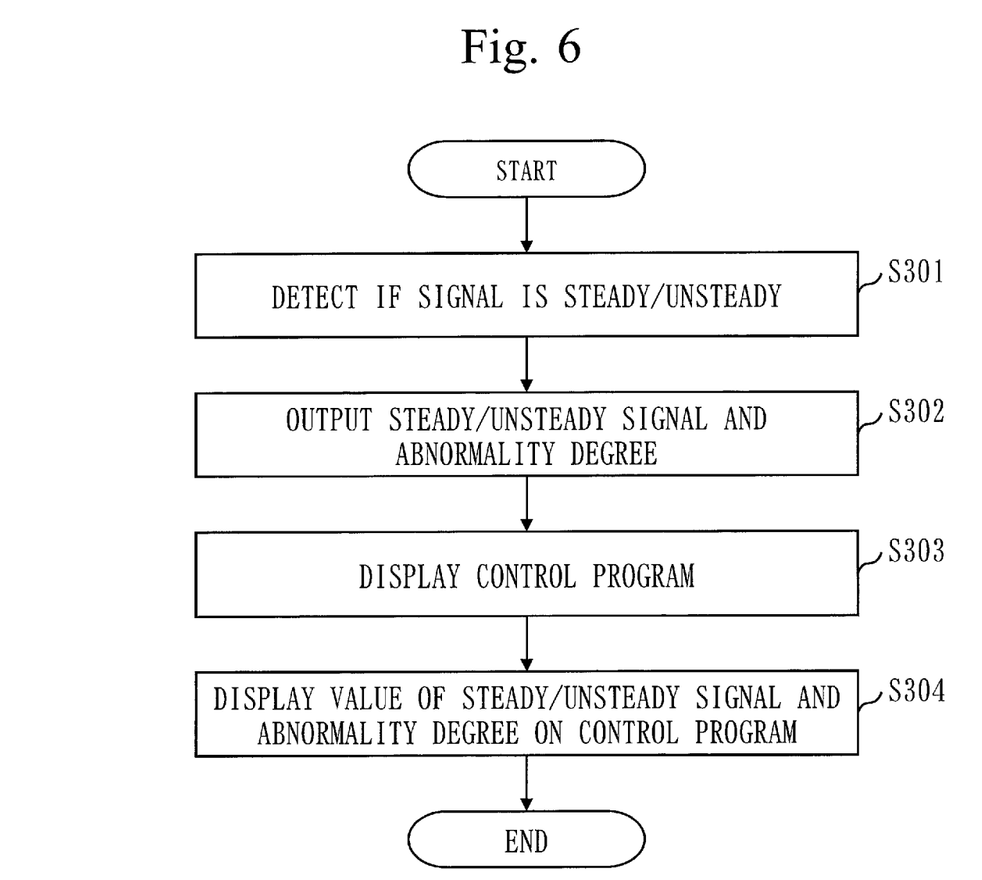
FIG. 6 is a flowchart illustrating behavior of a display system according to Embodiment 3.

The present embodiment will be described regarding mainly its difference from Embodiment 1 with referring to FIGS. 6 and 7.

Behavior of a display system 50 according to the present embodiment will be described with referring to FIG. 6. The behavior of the display system 50 corresponds to a display method according to the present embodiment.

A process of step S301 is the same as the process of step S101 and accordingly its description will be omitted.

Figure 7:
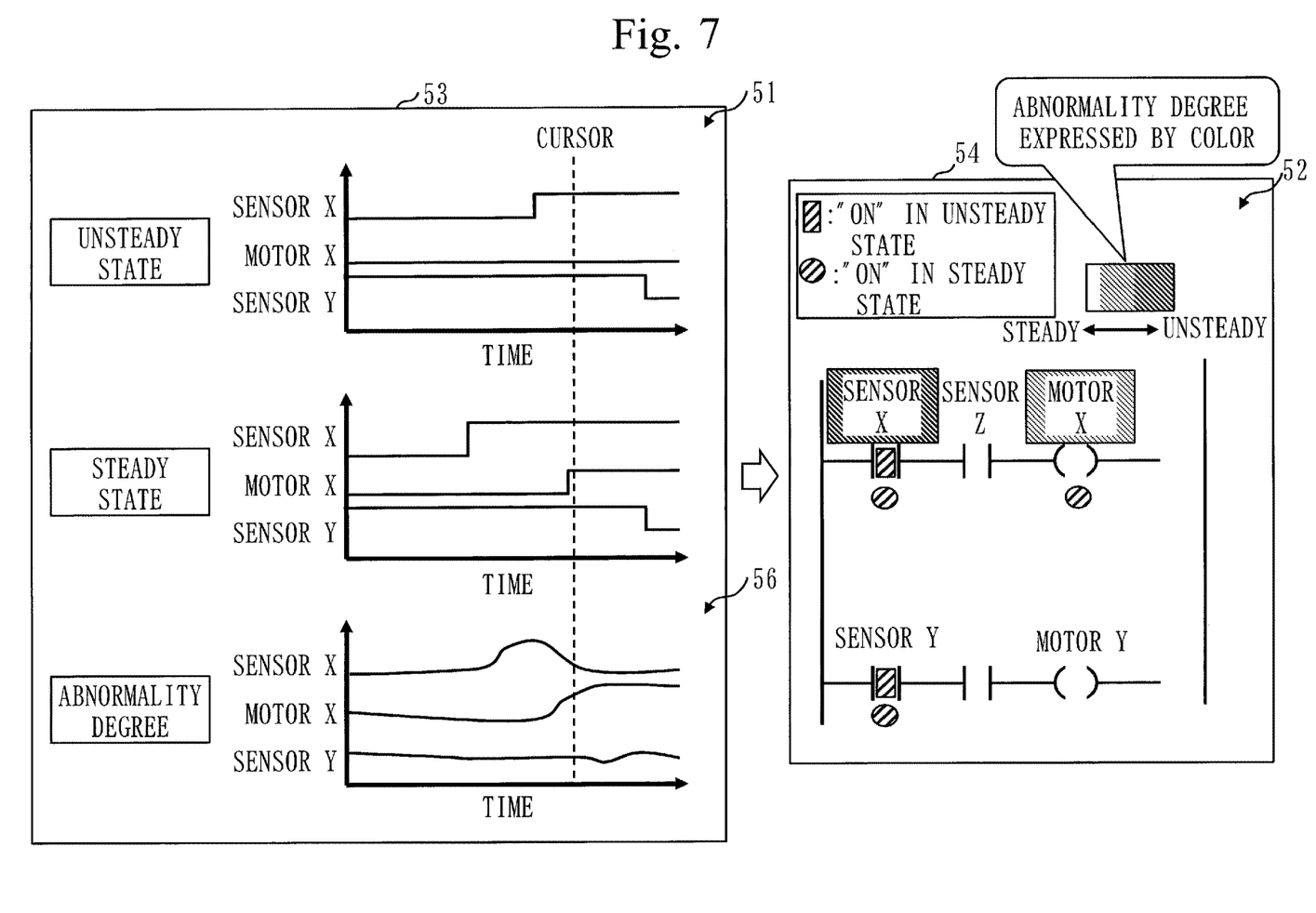
FIG. 7 is a diagram illustrating a screen example of the display system according to Embodiment 3.

In step S302, a display control device 10 controls a display device 30 to output a screen 53 as illustrated in FIG. 7, displaying an unsteady signal, a steady signal, and an abnormality degree 56, to a display 35.

A difference of a process of step S302 from the process of step S102 will now be described.

In the display control device 10, an acquisition unit 21 obtains an abnormality degree 56 of an unsteady signal. The abnormality degree 56 can be obtained from unsteady-signal signal data 51 or the like by a known method. Alternatively, the abnormality degree 56 may be given externally.

A control unit 22 transmits the abnormality degree 56 obtained by the acquisition unit 21 to the display device 30 using a communication device 13. Doing this, the control unit 22 controls the display device 30 to further display on the screen 53 the abnormality degree 56 of the signal acquired by the acquisition unit 21.

The display device 30 receives the abnormality degree 56 transmitted by the control unit 22, using a communication device 33. The display device 30 generates a time chart of the received abnormality degree 56. The display device 30 displays the generated time chart of the abnormality degree 56 together with a time chart of a steady signal and a time chart of an unsteady signal, adjacently on the screen 53 simultaneously. Doing this, the display device 30 further displays on the screen 53 the abnormality degree 56 of the value of the signal acquired by the acquisition unit 21.

A process of step S303 is the same as the process of step S103 and accordingly its description will be omitted.

In step S304, the display control device 10 controls the display device 30 to display the value of the unsteady signal, the value of the steady signal, and the abnormality degree 56, simultaneously on the control program 52. As the user changes a display-subject time point of the signal by moving, for example, a cursor, the display control device 10 updates the values of the signals and the abnormality degree 56 which are displayed on the control program 52.

A difference of a process of step S304 from the process of step S104 will now be described.

In the display control device 10, using the communication device 13, the control unit 22 transmits the abnormality degree 56 obtained by the acquisition unit 21 and corresponding to the time point specified by the operation unit 23, to the display device 30. Doing this, the control unit 22 controls the display device 30 to further display on the screen 54 the abnormality degree 56 of the value of the signal acquired by the acquisition unit 21.

Using the communication device 33, the display device 30 receives the abnormality degree 56 transmitted by the control unit 22. The display device 30 displays the value of the unsteady signal, on a portion in the code of the control program 52 on the screen 54 which corresponds to the signal, in a format that enables distinction of the abnormality degree 56 of the value of that signal. Doing this, the display device 30 further displays on the screen 54 the abnormality degree 56 of the value of the signal acquired by the acquisition unit 21.

As a specific example, assume that at a time point selected on the screen 53, an abnormality degree 56 of a value of a signal outputted from the sensor X is high, an abnormality degree 56 of a value of a signal outputted from the motor X is medium, and an abnormality degree 56 of a signal outputted from the sensor Y is low. In this case, in a ladder program on the screen 54, the display device 30 displays a label of a portion corresponding to the sensor X, with a deep-colored frame, displays a label of a portion corresponding to the motor X, with a pale-colored frame, and displays a label of a portion corresponding to the sensor Y, with no frame.

According to the present embodiment, the abnormality degree 56 of each signal can be expressed on the control program 52.

According to the present embodiment, the control unit 22 controls the display device 30 to display the abnormality degree 56 of a value of each signal on the screen 54. As a modification, the control unit 22 may control the display device 30 to display an abnormality degree of a value as an entirety of a plurality of signals, on the screen 54.

Embodiment 4

Figure 8:
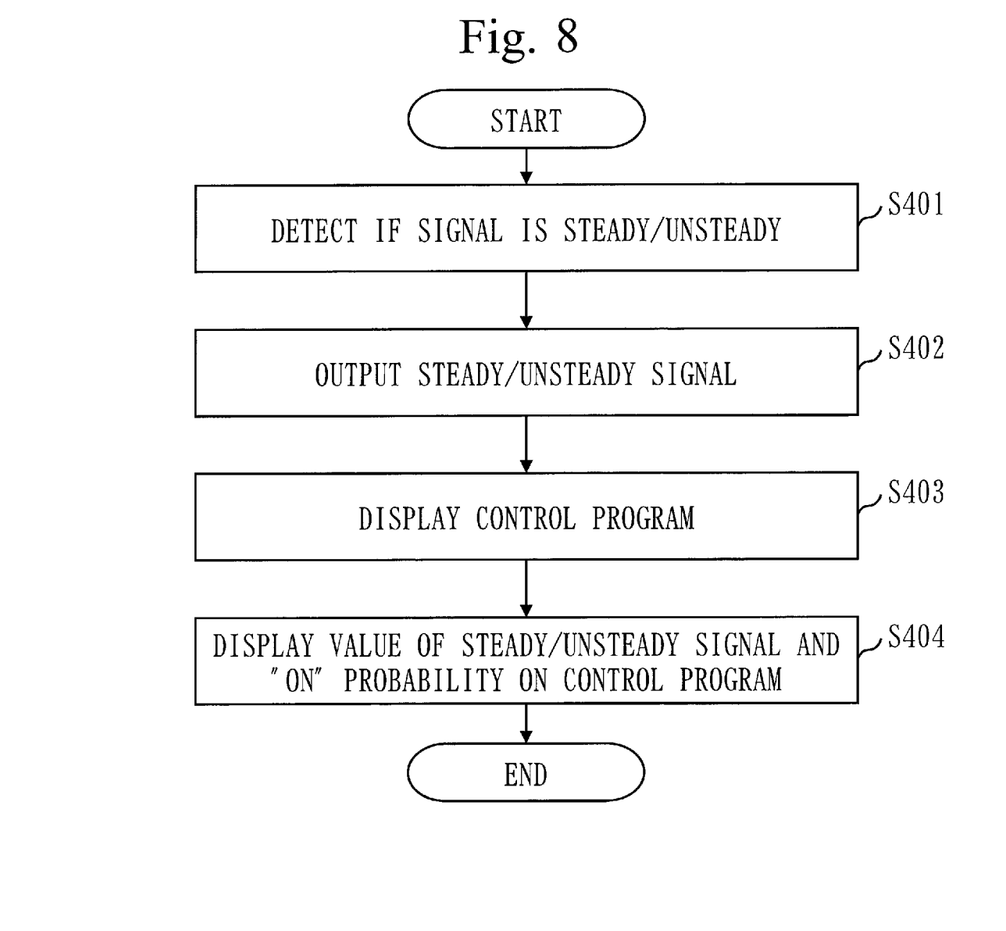
FIG. 8 is a flowchart illustrating behavior of a display system according to Embodiment 4.

The present embodiment will be described regarding mainly its difference from Embodiment 1 with referring to FIGS. 8 and 9.

Behavior of a display system 50 according to the present embodiment will be described with referring to FIG. 8. The behavior of the display system 50 corresponds to a display method according to the present embodiment.

A process of S401 is the same as the process of step S101, and accordingly its description will be omitted.

Figure 9:
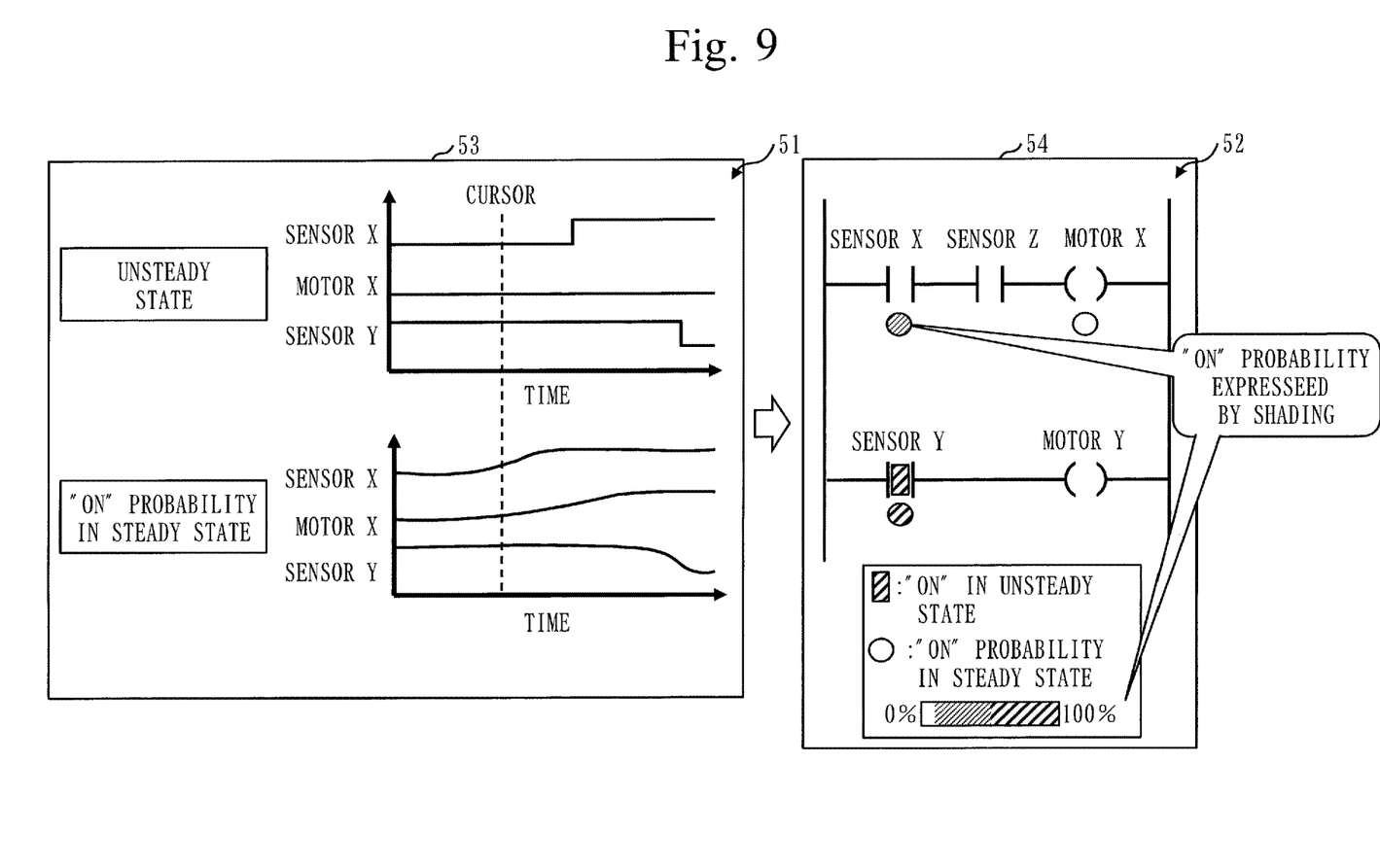
FIG. 9 is a diagram illustrating a screen example of the display system according to Embodiment 4.

In step S402, a display control device 10 controls a display device 30 to output a screen 53 as illustrated in FIG. 9, displaying an unsteady signal and an ON probability of a steady signal, to a display 35.

A difference of a process of step S402 from the process of step S102 will now be described.

In the display control device 10, an acquisition unit 21 obtains a probability that a steady signal is ON. This probability can be obtained from prediction data or the like of the steady signal by a known method. Alternatively, this probability may be given externally.

A control unit 22 transmits data expressing the probability obtained by the acquisition unit 21 to the display device 30 using a communication device 13, in place of steady-signal prediction data read by the acquisition unit 21. Doing this, the control unit 22 controls the display device 30 to further display on the screen 53 the probability that the steady signal is ON.

The display device 30 receives the data expressing the probability and transmitted by the control unit 22, using a communication device 33. The display device 30 generates a time chart of the probability expressed by the received data. The display device 30 displays the generated time chart of the probability in place of a time chart of the steady signal, together with a time chart of an unsteady signal, adjacently on the screen 53 simultaneously. Doing this, the display device 30 further displays on the screen 53 the probability that the steady signal is ON.

A process of step S403 is the same as the process of step S103 and accordingly its description will be omitted.

In step S404, the display control device 10 controls the display device 30 to display the value of the unsteady signal and the probability that the value of the steady signal is ON, simultaneously on the control program 52.

A difference of a process of step S404 from the process of step S104 will now be described.

In the display control device 10, using the communication device 13, the control unit 22 transmits the data obtained by the acquisition unit 21, expressing the probability that the steady signal is ON and corresponding to the time point specified by an operation unit 23, to the display device 30. Doing this, the control unit 22 controls the display device 30 to further display on a screen 54 the probability that the steady signal is ON.

Using the communication device 33, the display device 30 receives the data transmitted by the control unit 22 and expressing the abnormality that the steady signal is ON. The display device 30 displays the probability that the steady signal is ON, in place of the value of the steady signal value, on a portion in the code of the control program 52 on the screen 54 which corresponds to the signal. Doing this, the display device 30 further displays on the screen 54 the probability that the steady signal is ON.

As a specific example, assume that at a time point selected on the screen 53, a signal outputted from a sensor X is ON in the steady state with a medium probability and is OFF in the unsteady state, a signal outputted from a motor X is ON in the steady state with a low probability and is OFF in the unsteady state, and a signal outputted from a sensor Y is ON in the steady state with a high probability and is ON in the unsteady state. In this case, in a ladder program on the screen 54, the display device 30 displays a pale-colored circle on a portion corresponding to the sensor X, displays a colorless circle on a portion corresponding to the motor X, and displays a deep-colored circle and a colored square adjacently on a portion corresponding to the sensor Y.

According to the present embodiment, the probability that each binary signal is ON can be expressed on the control program 52. Also, in the present embodiment, since the probability that each binary signal is ON is displayed, the user can judge whether or not an unsteady-state situation involves a problem. For example, if a signal is ON in an unsteady state on a portion where the signal is ON in the steady state with a low probability, then the user can judge that the unsteady-state situation involves a problem.

REFERENCE SIGNS LIST

10: display control device; 11: processor; 12: memory; 13: communication device; 21: acquisition unit; 22: control unit; 23: operation unit; 30: display device; 31: processor; 32: memory; 33: communication device; 34: input device; 35: display; 50: display system; 51: signal data; 52: control program; 53: screen; 54: screen; 55: button; 56: abnormality degree; 60: apparatus.

The invention claimed is:

1. A display control device comprising:
processing circuitry
to acquire a value of a signal outputted from an apparatus during execution of a control program which controls the apparatus,
to obtain a selection from a user of a time point, and
to control a display device to display a code of the control program on a screen, and to display, for the time point, the value of the acquired signal, on a portion in the code which corresponds to the signal, in a format that enables distinction of a state of the apparatus for the time point when the value of the signal is outputted,
wherein the signal is a binary signal corresponding to either ON or OFF, and
wherein the processing circuitry controls the display device to further display a probability that the signal is ON for the time point.

2. The display control device according to claim 1, wherein, when the apparatus is in an unsteady state while the value of the signal is outputted, the processing circuitry controls the display device to simultaneously display the value of the signal outputted and a predicted value of the signal that would have been outputted if the apparatus were in the steady state.

3. The display control device according to claim 1, wherein the processing circuitry
accepts an operation of selecting a display-subject period of the signal from among two or more periods during which the value of the signal outputted is different from a value of the signal that would have been outputted when the apparatus is in a steady state, and
acquires the value of the signal outputted during the selected period.

4. The display control device according to claim 1, wherein the processing circuitry
accepts an operation of selecting a display-subject period of the signal from among two or more periods during which the value of the signal outputted has an abnormality degree exceeding a threshold value, and
acquires the value of the signal outputted during the selected period.

5. The display control device according to claim 1, wherein the processing circuitry controls the display device to further display an abnormality degree of the acquired value of the signal.

6. The display control device according to claim 1, wherein the processing circuitry
acquires values of a plurality of signals outputted separately from the plurality of apparatuses, and
controls the display device to display each of the acquired values of the plurality of signals, on a portion in the code which corresponds to each of the respective signals, in a format that enables to distinguish that each of the values of the plurality of signals is outputted in a case where the plurality of apparatuses are in the steady state as a whole from a case where the plurality of apparatuses are in the unsteady state as a whole.

7. The display control device according to claim 6, wherein the processing circuitry controls the display device to further display an abnormality degree of each of the acquired values of the plurality of signals.

8. The display control device according to claim 6, wherein the processing circuitry controls the display device to further display an abnormality degree of the acquired values of the plurality of signals in combination.

9. The display control device according to claim 6, wherein each of the plurality of signals is a binary signal corresponding to either ON or OFF, and
wherein the processing circuitry controls the display device to further display the probability that each of the plurality of signals is ON.

10. A display system comprising:
the display control device according to claim 1; and
the display device controlled by the processing circuitry to display the code and the value of the signal.

11. A display device comprising a display controlled by a display control device that acquires a value of a signal outputted from an apparatus during execution of a control program which controls the apparatus and obtains a selection from a user of a time point, to display a code of the control program on a screen, and to display, for the time point, the value of the signal acquired by the display control device, in a format that enables distinction of a state of the apparatus for the time point when the value of the signal is outputted,
wherein the signal is a binary signal corresponding to either ON or OFF, and
wherein the display device is controlled by the display control device to further display a probability that the signal is ON for the time point.

12. A display method comprising:
by a display control device, acquiring a value of a signal outputted from an apparatus during execution of a control program which controls the apparatus, and obtaining a selection from a user of a time point; and by a display device being controlled by the display control device, displaying a code of the control program on a screen, and displaying, for the time point, the value of the signal acquired by the display control device, on a portion in the code which corresponds to the signal, in a format that enables distinction of a state of the apparatus for the time point when the value of the signal is outputted, wherein the signal is a binary signal corresponding to either ON or OFF, and wherein the display device is controlled by the display control device to further display a probability that the signal is ON for the time point.

* * * * *